United States Patent Office 3,328,377
Patented June 27, 1967

3,328,377
RECOVERY OF ISOPRENE POLYMERS
Wilfrid Cooper, Aldridge, England, assignor to Dunlop Rubber Company Limited, London, England
No Drawing. Filed Dec. 2, 1964, Ser. No. 415,473
Claims priority, application Great Britain, Feb. 9, 1961, 4,794/61
11 Claims. (Cl. 260—94.3)

The present invention relates to a process for the separation of trans-polyisoprene from a polymerization reaction mixture wherein the separated polyisoprene contains negligible amounts of catalyst residues.

This application is a continuation-in-part of co-pending application Ser. No. 169,597, filed Jan. 29, 1962, now abandoned.

It is known that trans-polyisoprene may be prepared by contacting isoprene with certain catalysts formed from a mixture of a compound of a metal selected from Groups IV–A, V–A, VI–A, VII–A and VIII of the Periodic Table according to Menedeléeff with an organo-metallic compound, of which one of the most valuable catalysts is that from $VCl_3$ and $AlEt_3$. The reaction products from many of these systems are much more viscous than would be expected from the concentration of the polymer and its molecular weight. The catalyst systems containing $VCl_3$ show this effect to a marked degree, the reaction product having many of the characteristics of a three-dimensional gelled network. However, the polymerization reaction product is a viscous intractable coagulum in which large amounts of catalyst are present. In prior processes the trans-polyisoprene is separated by precipitation by contact with a large volume of a solvent such as methanol or acetone followed by further contact with a solvent such as water or alcohol in which the polymer is insoluble, or alternatively, the trans-polyisoprene is treated repeatedly with HCl-containing methanol then washed repeatedly with pure methanol and vacuum dried. In each of these two methods large volumes of treating agents are required, and neither method is very effective in reducing the level of residual catalyst present in the polymer. Residual catalyst levels as high as 1.5 percent are often encountered.

The present invention provides a process in which the residual catalyst level in the polymer may be reduced greatly in a simple and economical manner and a process in which the polymer can be obtained having a desired viscosity.

According to the present invention, a process for the preparation of trans-polyisoprene comprises contacting isoprene with a catalyst comprising vanadium trichloride and an organo-metallic compound selected from the class consisting of aluminium alkyls and aluminium alkyl halides to effect polymerization of said isoprene, mixing the polymerization reaction mixture containing trans-polyisoprene with an alcohol selected from the class consisting of isopropanol and tert-butanol in the presence of oxygen to reduce the viscosity of the reaction mixture to the desired value, adding water to the mixture when the viscosity is at a chosen value, and separating the aqueous phase formed containing the vanadium trichloride from the non-aqueous phase containing the trans-polyisoprene.

It is essential for the polymerization mixture, which contains catalyst residues, to be treated with isopropanol or tert-butanol in the presence of oxygen to effect breakdown of the viscous polymerization reaction product to reduce the viscosity thereof. This breakdown can be achieved by mixing the polymerization reaction mixture with the alcohol in the presence of air for a sufficient period of time (normally from ten minutes to three hours depending on the temperature). If desired, oxygen can be introduced into the reaction vessel instead of air. The air or oxygen employed is preferably substantially free of moisture.

The amount of oxygen employed to effect the breakdown is not critical provided there is sufficient oxygen present to reduce the viscosity to the desired value. The breakdown can, if desired, be effected in stages in which the reaction product is stirred with the alcohol in the presence of a small amount of oxygen until the oxygen is used up, then a further amount of oxygen is added. This procedure is repeated until the required viscosity has been obtained. However, to effect the breakdown in this manner is a lengthy procedure, and so the reaction product is usually stirred with the alcohol in the presence of an amount of oxygen in excess of that required to reduce the viscosity to the desired value. A large excess of oxygen can be used but the reaction in such a case is very rapid and it is difficult to stop the breakdown at the correct viscosity. Preferably, therefore, a large excess of oxygen is avoided, and amounts of oxygen between 2 mls. and 15 mls. per gramme of trans-polyisoprene are preferred.

The amount of oxygen required also depends upon the degree of conversion of isoprene to polyisoprene and upon the amount of vanadium trichloride present in the reaction mixture at the end of the polymerization reaction. The effect of the oxygen is to oxidise the tri-valent vanadium to a higher valency state, e.g. to a valency state of five, to oxidise any unchanged isoprene, and to effect breakdown of the polyisoprene. Thus, the amount of oxygen available for breakdown of the polyisoprene will depend upon the amount of oxygen made unavailable by reaction with the tri-valent vaanadium and with unchanged isoprene.

The amount of oxygen required is further dependent upon the mixing conditions employed, which in turn depend upon the viscosity of the reaction mixture. If the mixing conditions are not sufficient to produce an intimate dispersion of the oxygen within the reaction mixture, then the oxygen will contact only a small portion of the polyisoprene to be degraded. This is particularly so in the case of highly viscous reaction mixtures in which the oxygen tends to form a small number of large bubbles rather than large number of small bubbles. The effect of this is to effect breakdown of the polymer actually contacted by the oxygen but not to effect breakdown of the polymer not contacted by oxygen. The viscosity of the polyisoprene is closely related to the chain length of the polyisoprene and a substantial reduction in this viscosity is only achieved if substantially the whole of the long polymer chains are broken by the oxygen. If the oxygen does not form an intimate dispersion within the reaction mixture the effect will be to break down some of the polymer chains and not others, but the reduction in viscosity so obtained will not indicate a substantial breakdown of the polymer.

A still further factor which effects the amount of oxygen required is that when some polymer chains have been broken further oxygen may be used to break these shorter chains rather than break new long polymer chains. Thus, the amount of oxygen required will vary for particular reaction mixtures, but amounts between 2 mls. and 15 mls. per gramme of the polymer to be degraded are preferred as stated hereinbefore.

Water is added to the mixture to terminate the breakdown reaction when the viscosity of the mixture has been reduced to the required value. The viscosity can be measured at intervals of time to follow the course of the breakdown and to determine when sufficient breakdown has been effected.

The alcohol which is mixed with the polymerization reaction product may contain water, but the amount of water in the alcohol should not exceed an amount such that 0.1 percent of water based on the volume of the reaction mixture is present in the reaction vessel after decomposition of any organo-aluminium compound present.

The amount of alcohol employed is not critical provided there is sufficient alcohol present to destroy the organo-aluminium compound, and amounts of from 2 percent to 15 percent based on the volume of material being treated may be employed. The preferred amounts are from 2.5 percent to 5 percent based on the volume of material being treated, added to a solution of the trans-polyisoprene in a hydrocarbon solvent containing from 4 to 5 percent by weight of trans-polyisoprene based on the volume of hydrocarbon solvent. The amount of water added to the mixture of the alcohol and the polymerization reaction mixture should be sufficient to dissolve the alcohol and will generally range from one to three times the volume of the alcohol employed.

The non-aqueous phase which contains trans-polyisoprene and normally a polymerization solvent can be treated to recover the polymer by cooling to form a white crystalline precipitate of trans-polyisoprene which is recovered by filtration. Any insoluble material, such as aluminium hydroxide from the catalyst, which separates at the interface between the aqueous and non-aqueous phases can be removed by centrifugation, and any trans-polyisoprene present in the interface can be recovered separately by extraction with a hydrocarbon solvent such as n-hexane followed by addition of excess alcohol.

The aqueous phase may be evaporated to recover catalyst residues.

Preferably, the polymerization reaction mixture which contains trans-polyisoprene, residual catalyst and normally a polymerization solvent is mixed with the isopropanol or tert-butanol in the absence of air or oxygen until the mixture is homogeneous. The mixture is then mixed further while exposed to the atmosphere and this can be carried out at an elevated temperature, say 40° C. to 120° C., if desired. Preferably, the mixture is heated to a temperature of 40° C. to 80° C., say 50° C., while it is mixed. The rate at which the mixture is stirred depends on the temperature, the higher the temperature the lower the stirring rate and vice-versa. When the trans-polyisoprene is to be used eventually to form golf ball covers, then preferably the stirring is continued until the viscosity of the reaction mixture has fallen to a value within the following Table I. The viscosity depends on the concentration as is also shown.

TABLE I

*Concentration of solution*

| Percentage weight of trans-polyisoprene: | Viscosity (poises) |
|---|---|
| 10 | 2–4 |
| 5 | 0.2–1 |
| 2.5 | 0.04–0.1 |

At the completion of the mixing, water is added to the mixture which is then stirred again. If the temperature employed is such that it is above the boiling point of the iso-propanol or tert-butanol, or a component of the polymerization reaction mixture, the mixing should be carried out under pressure. Normally, it is expeditious to remove any unreacted isoprene from the polymerization reaction mixture before the mixture is heated under pressure.

Any small amounts of vanadium trichloride remaining in the trans-polyisoprene after treatment with the isopropanol or tert-butanol and water may be reduced by mixing the non-aqueous phase containing the trans-polyisoprene with a chelating agent such as aqueous ethylene diamine tetra-acetic acid. A further method of reducing the amount of vanadium trichloride is by passing the non-aqueous phase down an ion-exchange column.

Antioxidants and stabilizers may be added to the trans-polyisoprene before or after the polymer has been separated from the polymerization reaction mixture.

The polymerization process is normally carried out in the presence of a hydrocarbon solvent such as hexane, benzene or toluene at temperatures which may range from room temperature up to 100° C., and at atmospheric pressure or above. The isoprene employed should preferably be of at least 98 percent purity and should contain negligible amounts of acetylenic or oxygen-containing compounds.

The catalyst comprises vanadium trichloride and an aluminium alkyl or aluminium alkyl halide. In addition to the vanadium trichloride other halides or oxyhalides of the metals of Groups IV–A, V–A, VI–A, VII–A or Group VIII of the Mendeléeff Periodic Table may be used to form the catalyst and in addition to the aluminium compounds such as aluminium alkyl hydrides and aluminium alkoxides may be present. A particularly preferred catalyst is one formed from vanadium trichloride and aluminium triethyl.

The vanadium trichloride may be formed separately and mixed with the organo-aluminium compound to form the catalyst, or alternatively, vanadium tetrachloride may be mixed with the organo-aluminium compound and reduced to form the vanadium trichloride in situ within the polymerization reaction vessel.

The invention is illustrated by the following examples, in which all parts are by weight:

EXAMPLE 1

455 parts of a petroleum fraction consisting largely of n-hexane, purified by washing with concentrated sulphuric acid, water, distillation and drying over activated alumina to give a residual moisture content of 5 p.p.m., was charged into a pressure-tight stirred vessel through which dry nitrogen (moisture content 3 p.p.m.) had been passed for 16 hours to ensure freedom from air and moisture. To this was added 1.56 parts of vanadium trichloride and, with stirring, 2.93 parts of aluminium triethyl dissolved in 10 parts of the petroleum fraction previously referred to. 90.5 parts of isoprene were added and the mixture stirred for 40 hours at 50° C. The highly viscous solution (80,000 centipoises) was removed from the reactor after this time and diluted with 450 parts of the petroleum fraction referred to above, and 60 parts of isopropanol containing 0.5 part of phenyl-beta-naphthyl-amine were added. The mixture was then stirred at 10,000 r.p.m. for 15 minutes using a Polytron 10ST ultrasonic stirrer (rotor diameter 26.5 mm., stator diameter 27.5 mm.) immersed to a depth of two inches. Free access of dry air to the surface, which was 8 square inches, was permitted. The viscosity was reduced to 214 centipoises. Water (60 parts) was added and a further mixing given for 5 minutes' duration. On standing the mixture separated into two layers. The upper layer contained most of the trans-polyisoprene and very little vanadium compounds. The lower layer was an aqueous alcoholic solution of vanadium and aluminium salts. In addition, an interface formed between the two layers. The lower layer was separated and from it vanadium salts were recovered by evaporation. The upper layer was cooled to 0° C. and the white crystalline trans-polyisoprene so obtained was separated by filtration. The interface was treated separately. A further addition of the petroleum fraction furnished further quantities of trans-polyisoprene, but, in general, it was more convenient to isolate the polymer from the interface by precipitation with excess isopropanol. The yield of polymer, which closely resembled gutta-percha in physical properties having a melting transition of 57° C. to 58° C. was 60 parts. By infra-red examination it was found to possess the structure:

| | | |
|---|---|---|
| Trans-1,4 | percent | Above 98 |
| Cis-1,4 | do | 0 |
| 3,4 | | Traces |

The trans-polyisoprene had a gel content of 15 percent, an intrinsic viscosity (benzene) of 1.8, and the residual vanadium content was 0.03 percent.

EXAMPLE II

A trans-polyisoprene-containing reaction mixture prepared as in Example I and having a viscosity of 35,000 centipoises at 50° C. was treated with 5 percent to 10 percent of its volume of isopropanol, after adjusting the concentration of trans-polyisoprene in the solution to about 5 percent. The temperature of the mixture was then raised to 80° C. to 100° C. and the mixture was stirred at 10,000 r.p.m. for a period of up to two hours in a pressure-vessel with the addition of 1.5 litres of dry air (measured at 1 atmosphere and 20° C.). Unreacted isoprene was removed previously by distillation. The viscosity of the solution was then 20 centipoises. The alcohol and water-soluble vanadium salts were then removed by adding to the warm solution 2 parts of water per part of isopropanol added. After separating the aqueous phase for recovery of the isopropanol and the vanadium salts, the trans-polyisoprene was isolated by crystallisation by cooling the solution to about 10° C. Using this process, trans-polyisoprene was obtained with a vanadium content of 0.005 percent.

Trans-polyisoprene containing minute amounts of vanadium catalyst (e.g. 0.05 percent and below) actually shows a greater stability than pure gutta-percha.

A trans-polyisoprene purified according to the present invention to a vanadium content of 0.03 percent showed no change in the viscosity when suspended in a hydrocarbon solvent even after 150 hours whereas the viscosity of a similar suspension of pure gutta-percha was reduced even after as little as 50 hours.

EXAMPLE III

This example illustrates the reduction of viscosity of the reaction mixture by mixing with isopropanol in the presence of air.

A trans-polyisoprene-containing reaction mixture substantially free from unreacted isoprene prepared as in Example I and containing 7 percent by weight of the polymer having an initial viscosity of 20–40 poise, was mixed with 5 percent by weight of isopropyl alcohol. The viscosity fell to 15–20 poise and the colour of the mixture became brown rather than purple. Undissolved vanadium trichloride was present. In the absence of oxygen no further change occurred.

The mixture was split into two portions and the first exposed to oxygen (air) in an amount of 10 mls. of oxygen per gramme of polymer, at room temperature when the following changes in viscosity occurred:

| Time (hrs.): | Viscosity (centipoises) |
|---|---|
| 18 | 10.5 |
| 23 | 7.5 |
| 42 | 3.6 |

At higher temperatures (50–80° C.) and with stirring, comparable changes could be brought about within a much shorter time, e.g. 10 minutes to 1 hour.

10 percent by weight of water was added to the second portion with vigorous stirring in the absence of oxygen. The colour of the mixture was discharged and much of the vanadium was extracted into the aqueous portion but the viscosity of the polymer solution remained unchanged. Admission of air now made no difference. No detectable difference in viscosity occurred on standing for 24 hours at room temperature, and the viscosity fell only slightly on heating at 50° C. with stirring.

Water was added to the first portion and the residual catalyst removed as in Examples I and II.

EXAMPLES IV–VII

Four experiments were carried out by polymerizing isoprene in the presence of a polymerization catalyst, and the details are shown in the following table:

EXAMPLES IV–VII

|  | IV | V | VI | VII |
|---|---|---|---|---|
| Isoprene (gals.) | 4 | 4 | 4 | 4 |
| Petroleum hydrocarbon solvent (gals.) | 16 | 16 | 16 | 16 |
| Aluminum triethyl (lb.) | 0.2 | 0.74 | 0.74 | 0.47 |
| Vanadium trichloride (lb.) | 0.136 | 0.41 | 0.41 | 0.33 |
| Diisopropyl ether (lb.) | 0.54 | 1.53 | 0.51 | 1.27 |

The petroleum hydrocarbon solvent used was a mixture of paraffinic hydrocarbons, 66 percent, naphthenes 30 percent and aromatic hydrocarbons 4 percent and had a boiling range of 90° C. to 105° C.

The polymerizations were carried out in reactors in the absence of air and moisture, and the ingredients were stirred at a high speed. After 3.5 hours the yield of polyisoprene in Experiment No. IV was 18 percent, after 1 hour the yield of polyisoprene in Experiment No. V was 29 percent, after 5 hours the yield of polyisoprene in Experiment No. VI was 22 percent, and after 2 hours the yield of polyisoprene in Experiment No. VII was 25 percent. At the end of these times the respective polymerization mixtures were transferred to other reactors maintaining throughout the dry, air-free condition, and the polymerization reaction allowed to continue whilst the reactants were stirred at a low speed. After 8, 3, 8 and 4 hours respectively, the conversion to polymer in the polymerization reactions had reached 30, 46, 44 and 33 percent respectively. A further amount of the petroleum hydrocarbon solvent was then added to each of the polymerization reaction mixtures to effect a concentration of the polymer in the mixture of 4 to 5 percent by weight based on the volume of the mixture.

To each of the reaction mixtures an amount of isopropanol was added, as shown in the following table, and the mixture stirred for 30 minutes. Dry air was then introduced in an amount as shown, and the viscosity of the solution was measured at the intervals of time shown. At the desired level of viscosity the reaction was terminated by the addition of water in an amount of six times the volume of isopropanol employed for the particular experiment. Separation of the lower aqueous phase removed most of the vanadium and aluminium catalyst residues and the isopropanol. Ammonia, 320 mls., was then added to the non-aqueous phase to ensure the removal of traces of acidity and the solution cooled to recover white crystalline trans-polyisoprene with a low vanadium content of 0.02 to 0.09 percent. The following table illustrates the time of treatment for each experiment in the presence of oxygen, and the viscosity at the end of this time. In the following table, G represents the total volume of polymer solution to which the isopropanol is added.

| Expt. No. | G (gals.) | Isopropanol (percent) | Mls. oxygen/gram polymer | Time (mins.) | Viscosity (cps.) (50° C.) |
|---|---|---|---|---|---|
| IV | 20 | 3.9 | 2.6 | 0 | 1,000 |
|  |  |  |  | 2 | 500 |
|  |  |  |  | 5 | 100 |
|  |  |  |  | 7 | 70 |
| V | 22 | 5.0 | 9.7 | 0 | 1,000 |
|  |  |  |  | 5 | 500 |
|  |  |  |  | 10 | 340 |
|  |  |  |  | 15 | 120 |
|  |  |  |  | 17 | 90 |
| VI | 24 | 5.0 | 1.0 | 0 | 1,000 |
|  |  |  |  | 1 | 230 |
|  |  |  |  | 2 | 85 |
| VII | 20 | 4.4 | 5.0 | 0 | 1,000 |
|  |  |  |  | 3 | 470 |
|  |  |  |  | 5 | 100 |
|  |  |  |  | 7 | 60 |

The above table clearly shows the efficient reduction in viscosity that is obtained when the reaction mixture is mixed with alcohol in the presence of air. Samples of the solution from Experiments V and VII that had been treated for 17 minutes and 7 minutes respectively in the presence of alcohol and oxygen, were stored in the presence of some of the air for 24 hours at 50° C. The viscosities of the solution were then measured and the samples from Experiments V and VII had a viscosity of 95 centipoises, and 65 centipoises after being stored and an initial viscosity of 90 centipoises and 60 centerpoises respectively. This shows that the solutions obtained are extremely stable when stored.

EXAMPLE VIII

Three samples A, B and C of a polymerization reaction mixture were prepared according to the following formula:

| | A, B, and C |
|---|---|
| Petroleum hydrocarbon solvent___parts by volume__ | 200 |
| Aluminium triethy _____do____ | 4.9 |
| Diisopropyl ether _____do____ | 1.9 |
| Isoprene _____do____ | 52 |
| Vanadium trichloride _____part by weight__ | 0.35 |

The petroleum hydrocarbon solvent used was the same as in Examples IV to VII.

Reactants were charged in the order given into closed reactors in the absence of air or moisture and the reactors heated for 5 hours at 65° C. to give a semi-solid purple mass of swollen polymer containing catalyst residues. Each of the polymerization reaction mixtures A and B were diluted with 50 parts of petroleum hydrocarbon solvent and mixed well, and the temperature during this operation was maintained at 45 to 50° C.

Six parts of tert-butanol were added to Sample A and the deep-purple colour was retained. The alcohol dispersed readily in the solution.

Six parts of tert-butanol were added to Sample B followed by 15 mls. of oxygen per gramme of polymer. No colour change occurred at this time.

Six parts of methanol were added to Sample C followed by 15 mls. of oxygen per gramme of polymer. A green solution was obtained and the alcohol dispersed slowly.

All three samples were maintained at a temperature of 45 to 50° C. and stirred for 30 minutes. At the end of this time Sample B showed a noticeable decrease in viscosity to about 50 centipoises.

Sample C was an inhomogenous mixture and had a viscosity of about 1000 centipoises. Even after a further three hours breakdown the viscosity did not fall below 300 centipoises.

Water was then added to the samples and Sample A gave a viscous emulsion from which the catalyst residues could not be removed. Sample B resulted in a clear polymer solution from which the catalyst residues could be separated readily, as in Examples IV to VII, and a clean polymer was obtained by crystallization.

Sample C resulted in a turbid polymer solution in which the separation of the catalyst was incomplete, and a yellow-green polymer was obtained by crystallization.

Having now described my invention, what I claim is:

1. A process for the preparation of trans-polyisoprene which comprises contacting isoprene with a catalyst comprising vanadium trichloride and an organo-metallic compound selected from the class consisting of aluminium alkyls and aluminium alkyl halides to effect polymerization of said isoprene, mixing the polymerization reaction mixture containing trans-polyisoprene with an alcohol selected from the class consisting of isopropanol and tert-butanol in the presence of oxygen to reduce the viscosity of the reaction mixture to the desired value, adding water to the reaction mixture when the viscosity is at a chosen value, and separating the aqueous phase formed containing the vanadium trichloride from the non-aqueous phase containing the trans-polyisoprene.

2. A process according to claim 1 in which the amount of oxygen is from 2 to 15 mls. per gramme of the trans-polyisoprene.

3. A process according to claim 1 in which the volume of the alcohol is from 2 percent to 15 percent of the volume of the polymerization reaction mixture.

4. A process according to claim 3 in which the volume of water added to the mixture is from one to three times the volume of said alcohol.

5. A process according to claim 1 in which the said polymerization reaction mixture is first mixed with said alcohol in the absence of oxygen until a substantially homogeneous mixture is obtained and is then further mixed with said alcohol in the presence of oxygen prior to the addition of water.

6. A process according to claim 1 in which the polymerization reaction mixture is mixed with said alcohol in the presence of oxygen at a temperature of 40° C. to 120° C.

7. A process according to claim 6 in which the temperature is from 40° C. to 80° C.

8. A process according to claim 1 in which the polymerization reaction mixture is mixed with said alcohol in the presence of oxygen for a period of from 10 minutes to 3 hours.

9. A process according to claim 1 in which the non-aqueous phase containing the trans-polyisoprene is cooled to crystallise the trans-polyisoprene which is recovered by filtration.

10. A process for the preparation of trans-polyisoprene which comprises contacting isoprene with a catalyst comprising vanadium trichloride and aluminium triethyl to effect polymerization of said isoprene, mixing the polymerization reaction mixture containing trans-polyisoprene with isopropyl alcohol in an amount of from three percent to five percent based on the volume of the polymerization reaction mixture in the presence of oxygen in an amount of from 2 mls. to 10 mls. of oxygen per gramme of the trans-polyisoprene to reduce the viscosity of the reaction mixture to the desired value, adding water in an amount of six times the volume of said isopropanol to the reaction mixture when the viscosity is at a chosen value, and separating the aqueous phase formed containing the vanadium trichloride from the non-aqueous phase containing the trans-polyisoprene.

11. A process for the preparation of trans-polyisoprene which comprises contacting isoprene with a catalyst comprising vanadium trichloride and aluminium triethyl to effect polymerization of said isoprene, mixing the polymerization mixture containing trans-polyisoprene with tert-butanol in an amount of from three percent to five percent based on the volume of the polymerization reaction mixture in the presence of oxygen in an amount of from 2 mls. to 10 mls. of oxygen per gramme of the trans-polyisoprene to reduce the viscosity of the reaction mixture to the desired value, adding water in an amount of six times the volume of said tert-butanol to the reaction mixture when the viscosity is at a chosen value, and separating the aqueous phase formed containing the vanadium trichloride from the non-aqueous phase containing the trans-polyisoprene.

References Cited

UNITED STATES PATENTS

| 3,066,130 | 11/1962 | Grundmann et al. | 260—94.9 |
|---|---|---|---|
| 3,110,708 | 11/1963 | Wisseroth et al. | 260—94.9 |
| 3,114,744 | 12/1963 | Lasky | 260—94.3 |
| 3,157,712 | 11/1964 | Walker et al. | 260—94.3 |

FOREIGN PATENTS

| 839,489 | 6/1960 | Great Britain. |
|---|---|---|
| 840,861 | 7/1960 | Great Britain. |

JOSEPH L. SCHOFER, *Primary Examiner.*

E. J. SMITH, *Assistant Examiner.*